US008457297B2

(12) United States Patent
Hansen

(10) Patent No.: US 8,457,297 B2
(45) Date of Patent: Jun. 4, 2013

(54) DISTRIBUTING TRANSACTIONS AMONG TRANSACTION PROCESSING SYSTEMS

(75) Inventor: John Hansen, Nashville, TN (US)

(73) Assignee: Aspect Software, Inc., Chelmsford, MA (US)

( * ) Notice: Subject to any disclaimer, the term of this patent is extended or adjusted under 35 U.S.C. 154(b) by 1692 days.

(21) Appl. No.: 11/322,355

(22) Filed: Dec. 30, 2005

(65) Prior Publication Data

US 2007/0153996 A1    Jul. 5, 2007

(51) Int. Cl.
*H04M 3/00* (2006.01)
*H04M 5/00* (2006.01)
*G06Q 10/00* (2012.01)

(52) U.S. Cl.
USPC ..................... 379/265.02; 705/7.12

(58) Field of Classification Search
USPC ... 379/265.02, 266.05, 266.08, 219; 713/201; 705/7.12
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,815,566 A | 9/1998 | Ramot et al. | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,333,979 B1 * | 12/2001 | Bondi et al. | 379/219 |
| 6,345,305 B1 | 2/2002 | Beck et al. | |
| 6,349,328 B1 | 2/2002 | Haneda et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,434,619 B1 | 8/2002 | Lim et al. | |
| 6,584,191 B1 * | 6/2003 | McPartlan et al. | 379/265.02 |
| 6,732,156 B2 | 5/2004 | Miloslavsky | |
| 6,744,878 B1 | 6/2004 | Komissarchik et al. | |
| 6,868,152 B2 | 3/2005 | Statham et al. | |
| 7,406,171 B2 * | 7/2008 | Whitman, Jr. | 379/265.05 |
| 2002/0161876 A1 | 10/2002 | Raymond | |

(Continued)

FOREIGN PATENT DOCUMENTS

WO    WO-0125877 A2    4/2001

*Primary Examiner* — Duc Nguyen
*Assistant Examiner* — Sonia Gay
(74) *Attorney, Agent, or Firm* — Husch Blackwell LLP

(57) ABSTRACT

A method and system to distribute transactions among a plurality of transaction processing systems is described herein. The method includes automatically receiving data from a first transaction processing system; identifying scheduled handling resources for each of the transaction processing systems for a first time interval based on the data from each transaction processing system; determining transaction allocations for each of the transaction processing systems based upon generated forecast data; and distributing transactions among the plurality of transaction processing systems by producing routing decisions based upon the determined transaction allocations and the scheduled handling resources.

28 Claims, 6 Drawing Sheets

U.S. PATENT DOCUMENTS

2002/0174222 A1 11/2002 Cox
2003/0217292 A1* 11/2003 Steiger et al. .................. 713/201
2004/0006629 A1 1/2004 Kino et al.
2004/0111302 A1 6/2004 Falk et al.

* cited by examiner (DISTRIBUTING TRANSACTIONS AMONG A PLURALITY OF TRANSACTION PROCESSING SYSTEMS)

DISTRIBUTING TRANSACTIONS AMONG TRANSACTION PROCESSING SYSTEMS

FIELD

The application relates generally to the field of customer interaction systems, more specifically to distributing transactions among customer interaction systems.

BACKGROUND

Call centers are sites at which incoming customer phone calls, such as 800-prefixed calls, are received and answered by agents. Typically, each call center is staffed by agents associated with one or more skill groups or agents having experience with one or more types of applications. In this manner, a particular call may be routed to an agent having an appropriate level of expertise for handling the call. For example, an agent might belong to a skill group that services Spanish-speaking speaking callers and/or a group that handles sales calls.

Additionally, today's call centers are often no longer centralized in a single location. As a result, enterprises coordinate call centers across multiple physical sites. While workforce management software offers resource planning solutions, including forecasts of call volumes and arrival patterns, and staffing calculations based on desired service quality, a difficult issue in multisite call center integration is balancing call loads among multiple locations.

Workforce scheduling systems assign staff to respective work schedules periodically. Workforce scheduling systems may take into consideration forecasted customer demands, budgetary concerns (e.g., overtime), individual personnel skills and schedule preferences, staff availability at each call center site, and Federal Regulations (e.g., breaks). As the size of a workforce grows, so does the complexity of workforce scheduling systems.

Because of such complexity, workforce scheduling systems often does not have the flexibility, especially with regard to multiple call center locations, to be responsive to changing forecast conditions to meet dynamic customer demands efficiently.

SUMMARY

According to an aspect of the present subject matter, a method and system to distribute transactions among a plurality of transaction processing systems is described herein. The method includes automatically receiving data from a first transaction processing system; identifying scheduled handling resources for each of the transaction processing systems for a first time interval based on the data from each transaction processing system; determining transaction allocations for each of the transaction processing systems based upon generated forecast data; and distributing transactions among the plurality of transaction processing systems by producing routing decisions based upon the determined transaction allocations and the scheduled handling resources.

Other features of the present invention will be apparent from the accompanying drawings and from the detailed description which follows.

BRIEF DESCRIPTION OF DRAWINGS

An example embodiment of the present invention is illustrated by way of example and not limitation in the figures of the accompanying drawings, in which like references indicate similar elements and in which.

DETAILED DESCRIPTION

Figure 1:
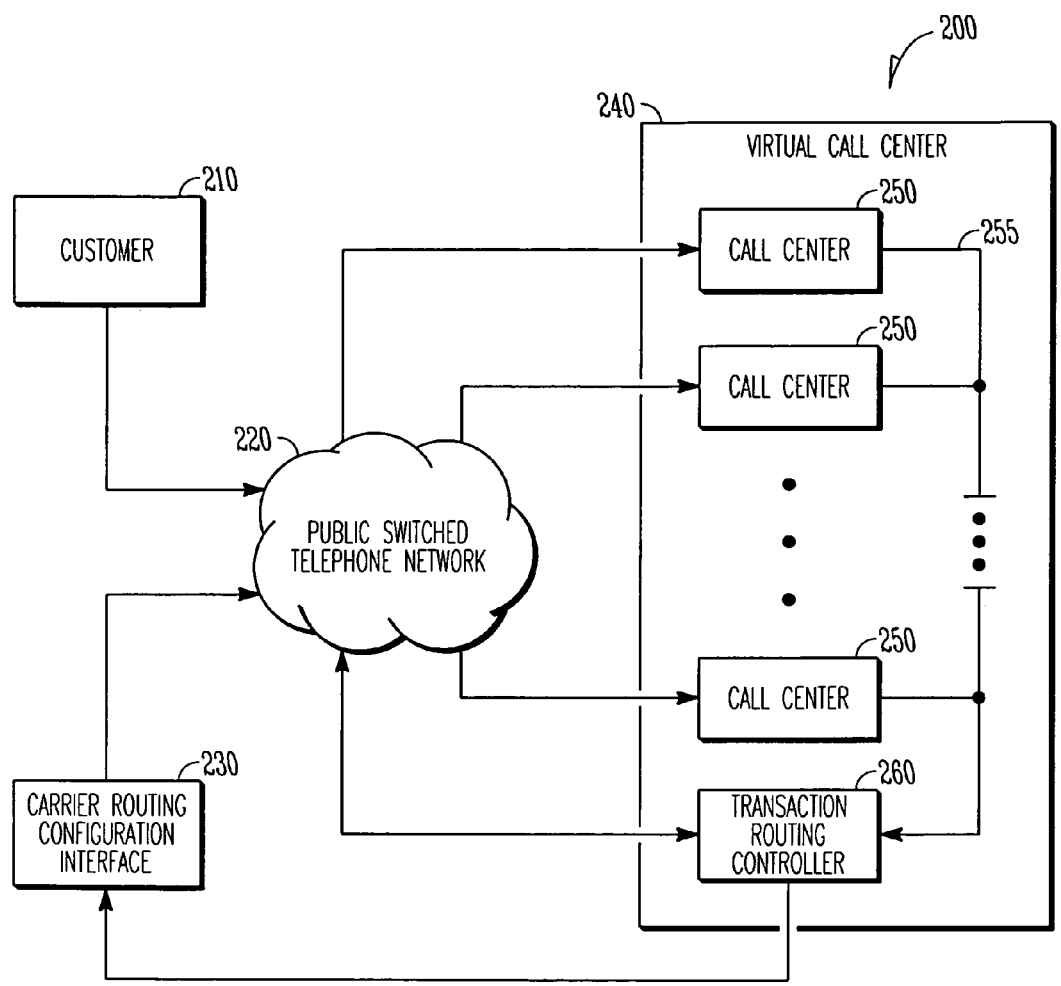
FIG. 1 illustrates a virtual call center environment in which one embodiment may be implemented.

According to an aspect of the present subject matter, there is provided a method and system to distribute transactions among a plurality of transaction processing systems. The method includes automatically receiving data from a first transaction processing system; identifying scheduled handling resources for each of the transaction processing systems for a first time interval based on the data from each transaction processing system; determining transaction allocations for each of the transaction processing systems based upon generated forecast data; and distributing transactions among the plurality of transaction processing systems by producing routing decisions based upon the determined transaction allocations and the scheduled handling resources.

In the following description, for the purposes of explanation, numerous specific details are set forth in order to provide a thorough understanding of the disclosed embodiments. It will be apparent, however, to one of ordinary skill in the art that the disclosed embodiments may be practiced without some of these specific details. In other instances, well-known structures and devices are shown in block diagram form.

Dynamic Call Distribution

As transactions, such as calls, are received, the transactions are routed to an agent dynamically. One of two approaches is typically employed for performing dynamic call distribution, (1) routing on a call-by-call basis and (2) allocation routing. In general, call-by-call routing typically involves the use of a carrier feature, such as AT&T's Intelligent Call Processing (ICP), MCI's Intelligent Call Router (ICR), or Sprint's Sprint Interface to External Routing Processor (SITERP), that allows a telephone customer to which a call is destined the opportunity to select call routing terminations on a call-by-call basis. Briefly, upon receiving an incoming 800-prefixed call, for example, the carrier's Service Control Point (SCP) server sends a route request, including various call characteristics, to a transaction routing controller at the called organization's premises. The organization's transaction routing controller provides a routing decision to the SCP based upon real-time data collected from the organization's call centers, including handling resources (e.g., agents) at each center, call load, skills, and agent availability. Finally, the carrier routes the call to the destination indicated by the transaction routing controller.

In contrast, allocation routing does not individually process each incoming call based on real-time data to arrive at a routing decision. Rather, allocation routing refers to a mechanism that distributes calls to call centers according to preset percentage allocations associated with each of an organization's call centers for the current time segment (typically a 15 to 30 minute interval). Briefly, based upon scheduled staffing levels, historical call data (e.g., call volume, average handle time), and the desired service quality for each call center, percent allocations for one or more future time segments are generated for the call centers and uploaded to the carrier network. Subsequently, routing is performed internally to the carrier network according to the preset percentages, corresponding to the current time segment. AT&T's Quick Call Allocator is an example of such a routing management service.

While embodiments of the present invention will be described with reference to call centers, the method and apparatus described herein are equally applicable to other types of transaction processing environments. Additionally, while embodiments are illustrated with reference to the transaction processing systems including automatic call distributors (ACDs), the method and apparatus described herein are also applicable to various other transaction processing systems, such as email, video, fax, IP telephony, and web servers. As described herein, resources may be considered "agents", and the transaction distribution calculations described herein are generally applicable to other types of handling resources, such as computer telephony integration (CTI) terminals, computers, data reception/processing devices, interactive voice response (IVR) ports, transaction agent telephone/service terminals, or a variety of other devices capable of servicing transactions.

For purposes of an example, it is assumed that a number of transaction or call center sites are networked together so as to function as a virtual call center. The call center site that includes the transaction routing controller is referred to as the central (or local) call center site, while the remaining sites are referred to as remote call center sites. The workforce manager and/or call center manager may be generally associated with the central or local call center site. The workforce manager and/or call center manager may be an automated system in some embodiments.

An Example Virtual Call Center Environment

FIG. 1 illustrates a virtual call center environment 200 in which one embodiment of the present invention may be implemented. According to this example, a virtual call center 240 is comprised of a plurality of call centers 250 and a transaction routing controller 260 communicatively coupled to the call centers by a wide area network (WAN) 255. Each call center 250 represents a site at which incoming customer transactions, such as 800-prefixed phone calls, may be received and handled by agents trained in one or more types of applications. It will be apparent to those of ordinary skill in the art that the customer transactions described herein include a wide range of transactions, a small subset of which includes 800-prefixed phone calls. Other examples of the types of customer transactions handled by various embodiments are set forth below. As a result of today's decentralization, the call centers 250 may each reside in different locations around the globe. The call centers 250 may further integrate multiple products from a variety of vendors. In other transaction handling environments, incoming transactions may comprise voice communications (i.e., phone calls), electronic transactions, such as electronic mail, computer data exchange, faxes, video sessions, and/or other data forms capable of conveying service requests, including interactions by way of a web site, for example. As such, the virtual call center environment merely serves as an example of one of the many transaction handling environments in which the present invention may be employed.

Briefly, in response to routing queries by a network interface (shown in FIG. 6 at 620), e.g., the SCP server of a carrier, such as AT&T, MCI, or Sprint, the transaction routing controller 260 provides dynamic call routing decisions based upon percentage allocations that have been calculated for each of the potentially geographically dispersed call centers 250. As will be described in detail below, the transaction routing controller 260 receives schedule data from each of the transaction processing systems, such as the call centers 250, and then produces allocation percentages (i.e., calculated allocation percentages) for the transaction processing centers, e.g., the call centers 250. Rather than generating routing decisions based upon the percentage allocations, the allocation controller (i.e., transaction routing controller) 260 may alternatively provide allocation sets which include the calculated allocation percentages to a carrier routing configuration interface 230, such as AT&T's Routing Manager II, Route It!, or the like by a dial-up modem connection, dedicated phone line, RS-232, Ethernet, or some other communication medium thereby providing dynamic adjustments to the carrier's internal call routing. The carrier routing configuration interface 230 may be either internal to or external to a public switched telephone network 220.

While in this example, the transaction routing controller 260 is shown to be separate from the call centers 250, the transaction routing controller 260 may be alternatively co-located with a call center 250.

A customer 210 that has dialed an organization's 800-prefixed number, for example, may be connected to one of the call centers 250 by way of the public switched telephone network (PSTN) 220. The customer's call is routed to one of the call centers 250 based upon currently active allocation percentages, as will be described in more detail below.

An Example Call Center

Figure 2:
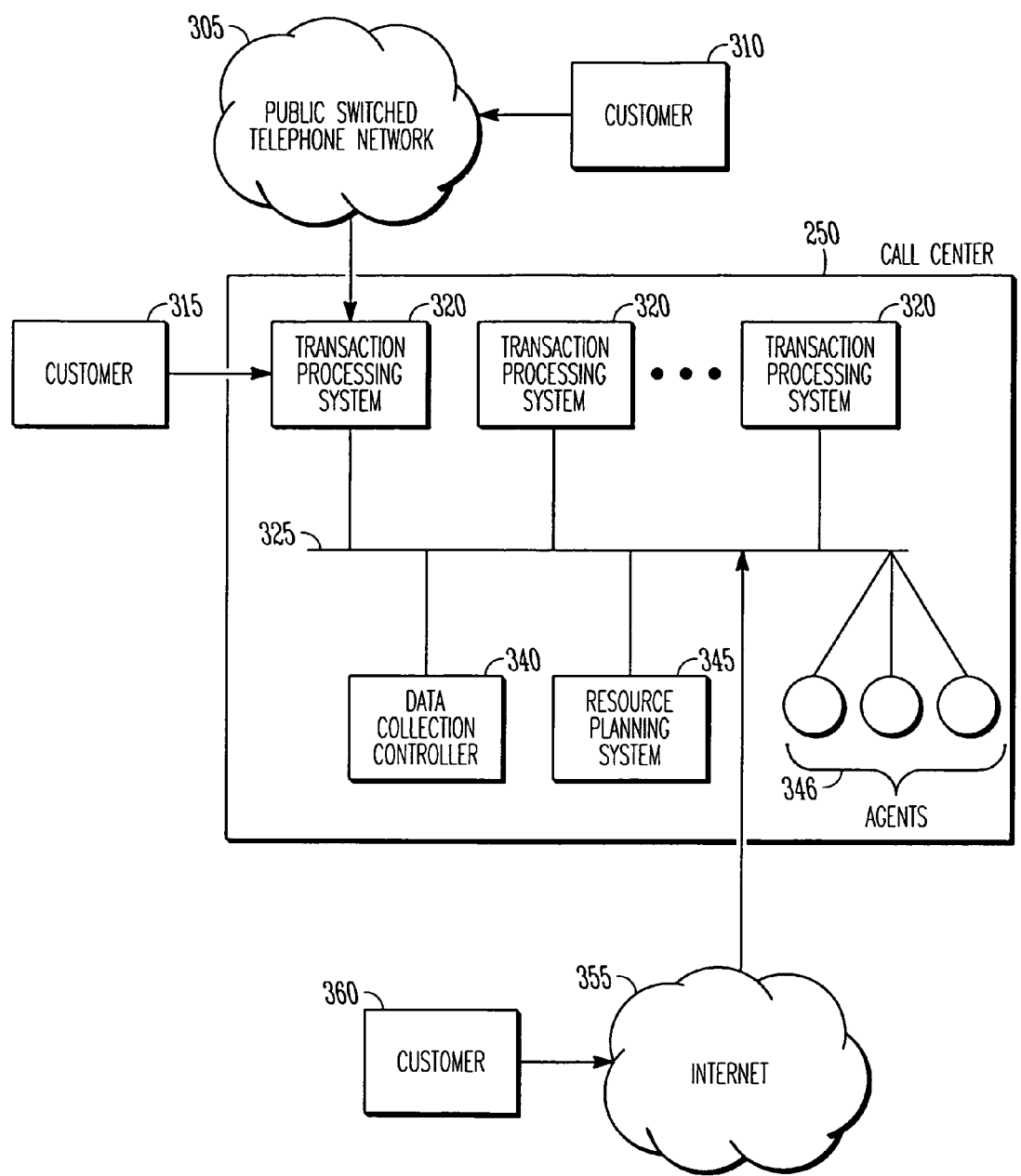
FIG. 2 illustrates call center equipment according to one embodiment.

FIG. 2 illustrates call center equipment according to one embodiment of the present invention. A call center may not be limited to handling telephone calls. To illustrate the breadth of what is being referred to herein as a "call center," in this example, customers 310, 315, and 360 are shown accessing a call center 250 via the public switched telephone network (PSTN) 305, a local line, and the Internet 355, respectively. The call center 250 depicted includes one or more transaction processing systems 320, a resource planning system 345, and a data collection controller 340 connected by a local area network (LAN) 325.

The one or more transaction processing systems 320 may receive customer requests by way of the PSTN 305, the Internet 355, or other public or private communication network, such as a paging network. One or more agents 346 may handle customer requests arriving at the transaction processing systems 320. Example transaction processing systems 320 include email, fax, video, and web servers, and/or automatic call distributors (ACDs). Therefore, customer transactions, such as customer requests, may take the form of phone calls, voice mail, email messages, facsimile requests, and HTML form submissions, for example. In alternative embodiments, other forms of customer interaction are envisioned, such as communications by way of one-/two-way paging, video, and other forms of communication.

Some embodiments include the resource planning system 345, which automatically creates future work schedules based on call volume forecasts and staffing specifications. Call volume estimates may take into account historical call volumes, seasonal patterns, day-of-week patterns, and special events, such as sales promotions and product introductions. Additionally, the resource planning system 345 may also provide a user interface to accept and record schedule exceptions. In one embodiment, the resource planning system 345 comprises a TeleCenter System available from Aspects® Telecommunications, Incorporated of Brentwood, Tenn. (Aspect is a registered trademark of Aspect Communications Corporation of San Jose, Calif.). In other embodiments, the resource planning system 345 may be omitted and schedules and call volume forecasting may be performed manually. Alternatively, the resource planning processing may be incorporated into the transaction routing controller 260 (shown in FIG. 1).

As will be described in more detail below, the data collection controller 340 may be a computer system that, among other things, monitors and records status information from the one or more transaction processing systems 320, processes the status information, and communicates routing parameters used for percent allocation calculation to the transaction routing controller 260 via the WAN 255. The data collection controller 340 may also provide a user interface to define routing workflows, configure system, component and interface parameters, view real-time status, alarms, and reports, and other call center configurations. While the data collection controller 340 and the resource planning system 345 are shown as separate systems, in other embodiments the two systems may be combined onto one system.

Allocation and Routing Cycle

Figure 3:
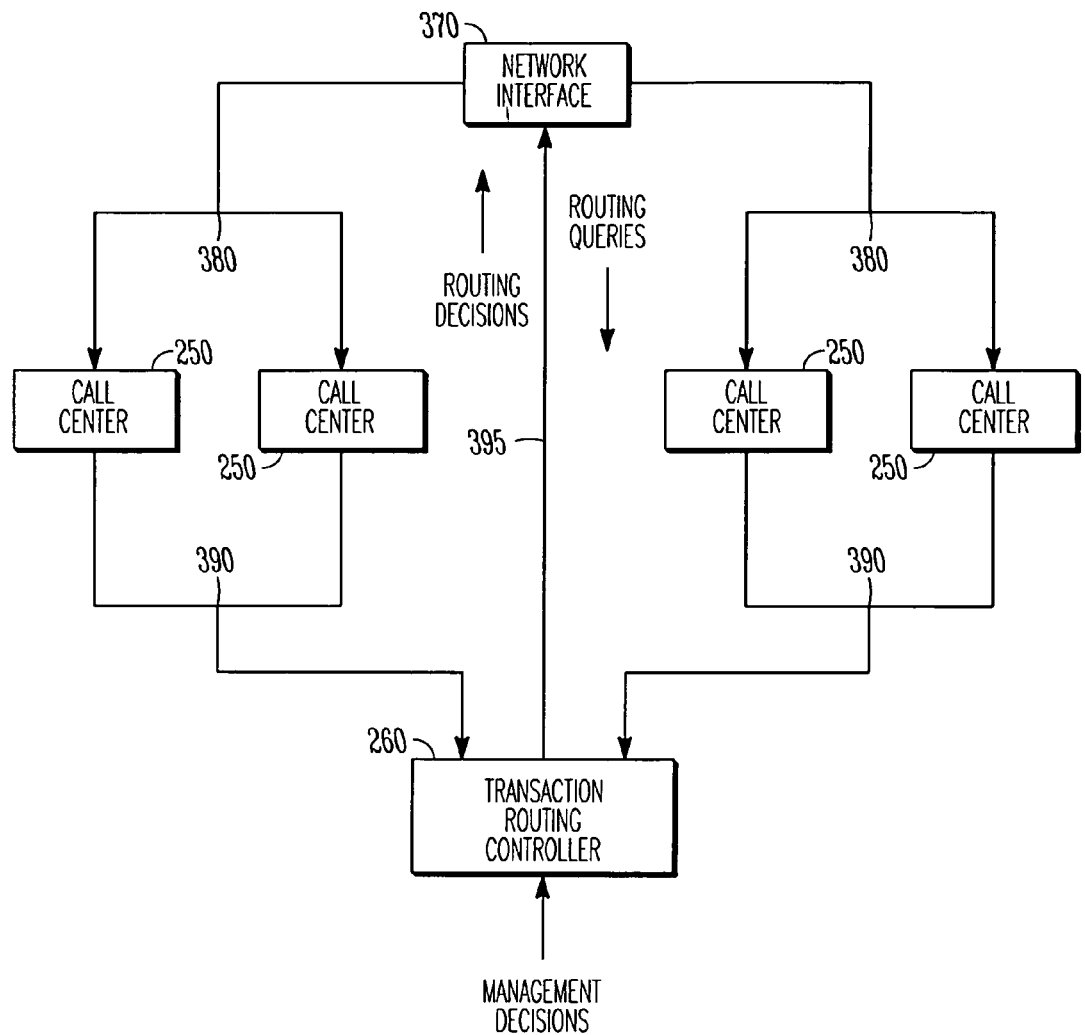
FIG. 3 illustrates transaction processing according to one embodiment.

FIG. 3 illustrates transaction processing according to one embodiment. Each call center 250 sends allocation calculation data 390 (also referred to as routing parameters), such as forecast data, schedule tallies, average handle time, real-time actual staffing information, and other quality metric information to a transaction routing controller 260.

The transaction routing controller 260, using the allocation calculation data and parameters that are based on management decisions (e.g., desired service level, cost constraints), calculates allocation percentages for each call center 250, and maintains them for purposes of performing call-by-call (CBC) routing responsive to routing requests from a network interface 370 of a public or private network, for example. An example allocation calculation is discussed below with reference to item 490 of FIG. 4.

In this manner, an interexchange carrier (IXC), such as AT&T, MCI, or Sprint, may route transactions, such as calls 380, to the appropriate transaction processing system based upon the currently active allocation percentages.

Alternatively, the transaction routing controller 260 may provide the allocation percentages to a routing process of a public or private network, for example. In the case of allocation percentages being provided to an interexchange carrier (IXC), such as AT&T, MCI, or Sprint, the carrier's routing process subsequently routes transactions, such as calls 380, to the appropriate transaction processing system based upon the allocation percentages for the current time period.

Figure 4:
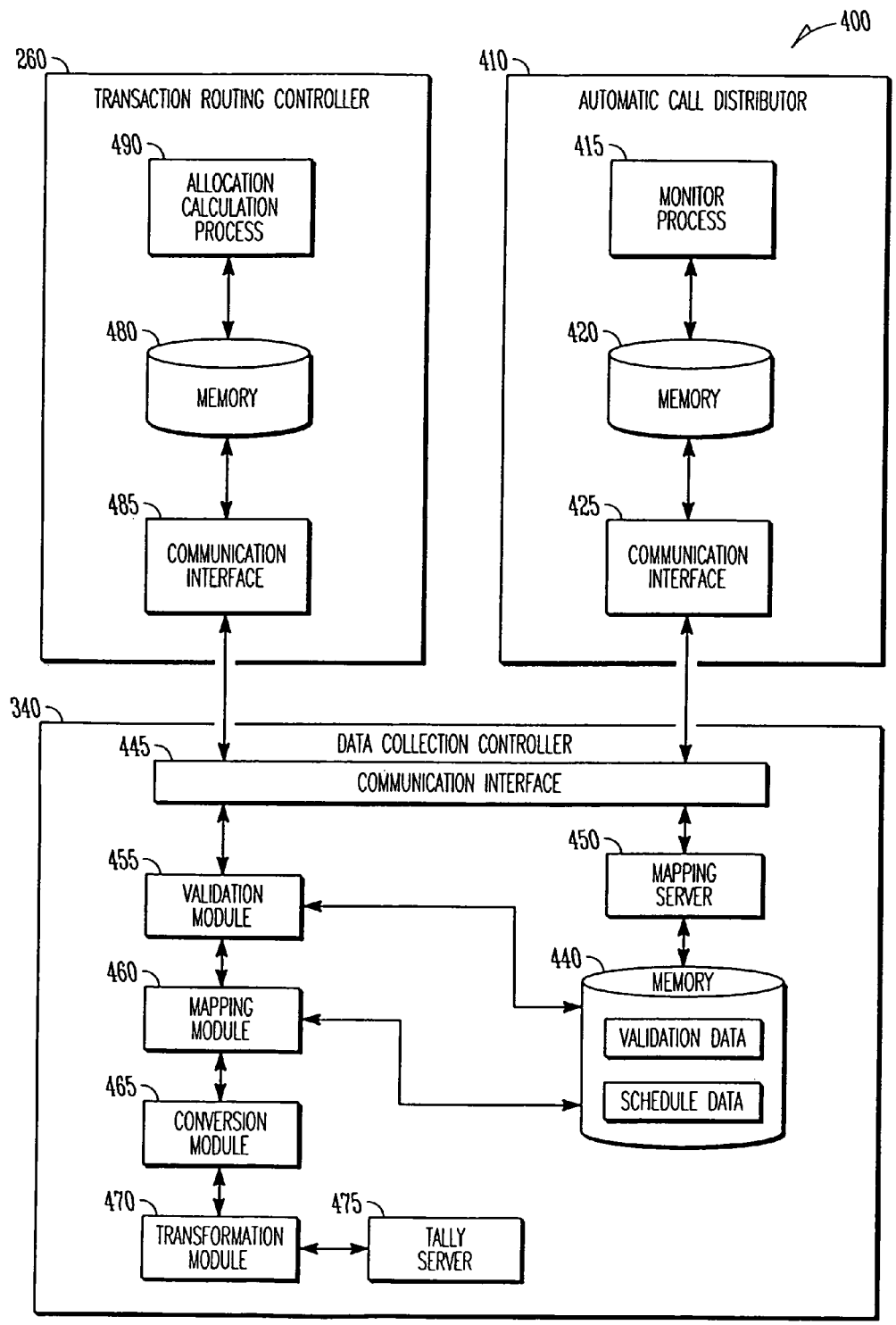
FIG. 4 illustrates the interaction of various processes according to one embodiment.

FIG. 4 is a block diagram illustrating the interaction of various processes according to one embodiment of the present invention. In this example, a remote call center 400 includes an automatic call distributor (ACD) 410 and a data collection controller 340. In the embodiment shown, ACD 410 and data collection controller 340 are not both included in the remote call center 400. In an embodiment, the ACD 410 is an Aspect ACD System available from Aspect Telecommunications, Incorporated of San Jose, Calif. The ACD 410, according to this example, includes a monitor process 415, a memory 420, and a communication interface 425. The monitor process 415 records real-time information to memory 420, such as the status of agents (e.g., available, idle, ready, reserved, talking, not ready, etc.) and various call statistics (e.g., calls offered, calls incoming, calls routed, calls abandoned, calls answered, calls handled, calls in progress, calls in queue, average handle time, average speed of answer, etc.).

Communications interfaces 425, 445, 485 of FIG. 4 correspond to the automatic call distributor 410, the data collection controller 340 and the transaction routing controller 260, respectively. The communication interface 445 is to communicate with the transaction processing systems 320 and/or the transaction routing controller 260. Communication between the interfaces 425, 445, 485 may be over a TCP/IP connection, for example. In one embodiment, the communications interfaces 425, 445, 485 may include one or more of the Aspect brand Real-time Bridge, Application Bridge® and/or InfoAccess feed (Application Bridge is a registered trademark of Aspect Telecommunications, Incorporated of San Jose, Calif.). Alternatively, the Information System Service (ISS) product of Aspect Telecommunications, Incorporated may be employed to provide the status information about the call centers in the enterprise to the transaction routing controller 260.

Data Collection Controller

The data collection controller 340 includes a memory 440 to record status information from one or more of the transaction processing systems (TPS) 320. As will be described further below, the data collection controller 340 may collect schedule data from the transaction processing systems at, for example, a first sampling frequency and store the schedule data in memory 440. In an example, the schedule data may be automatically extracted from the transaction processing systems at regularly scheduled time intervals. The data collection controller 340 may interface with and collect information from entities other than ACDs. For example, information may be collected from interactive voice response (IVRs), fax, video, email and/or web servers.

The data collection controller 340 processes the status information received from the transaction processing systems 320. The processing may involve a mapping server 450, a validation module 455, a mapping module 460, a conversion module 465, a transformation module 470, and a tally server 475.

The mapping server 450 may receive, from a first transaction processing system 320, mapping information including a first key, a first transaction processing system site ID, and/or a resource group associated with the first key. This mapping information may be stored at memory 440 and retrieved at a later date, as described below. The mapping information may be received before schedule data or with schedule data. The mapping information and schedule data may be in XML format.

The validation module 455 may, upon receipt of the schedule data from the first transaction processing system, validate the received schedule data. In the instance where the mapping information was sent before the schedule data, as opposed to with the schedule data, a second key may be received along with the schedule data. The validation module 455 may compare or match the first key to the second key. The validation module 455 may then validate the schedule data if a key matches, or discard the data if no key is found. The validation module 455 may optionally be included.

The mapping module 460 includes processing logic for mapping the resource group associated with the first transaction processing system to a corresponding resource group of the second transaction processing system. The second transaction processing system may be a local system, where the Workforce manager may consider the second transaction processing system to be local or internal, and other transaction processing systems to be external. The resource group may be mapped to the corresponding resource group in order to match up and gather corresponding data of the resource groups to use in further analysis.

The conversion module 465 may convert the received schedule data of the first transaction processing system to a same time zone of the second transaction processing system and/or convert the received schedule data of the first transaction processing system to the same time interval as the second transaction processing system.

The transformation module 470 may transform the received schedule data of the first transaction processing system from an export (output) format into an import (input) format for consumption by the second transaction processing system.

The tally server 475 may tally the schedule data from each of the transaction processing systems for the first time interval, as well as for other time intervals. The tally server may include a utility that counts resources and/or transactions. The tally server may identify scheduled handling resources for each of the transaction processing systems for the first time interval based on the schedule data from each of the transaction processing systems.

Transaction Routing Controller

In this example, the transaction routing controller 260 further includes a memory 480 and an allocation calculation process 490. The transaction routing controller 260 may receive the schedule data of the transaction processing systems 320 from the data collection controller 340 through the communication interface 485. Depending upon the implementation, the data may be pushed by the data collection controller 340 over a WAN connection or queried by the transaction routing controller 260. In the former case, the schedule data may be periodically received by the central call center at a scheduled time interval, for example.

The transaction routing controller 260 may determine transaction allocations for each of the transaction processing systems based upon generated forecast data using the allocation calculation process 490. Further, the transaction routing controller 260 may distribute transactions among the plurality of transaction processing systems 320 by producing routing decisions based upon the determined transaction allocations of the allocation calculation process 490 and based upon the scheduled handling resources from the tally server 475.

In one embodiment, a percent of transactions to be allocated to each of the transaction processing systems 320 is determined at the allocation calculation process 490.

The transaction routing controller 260 generates allocation percentages and balances future call distribution among the transaction processing systems 320 by providing routing decisions to a network interface, such as a carrier interface, based upon the allocation percentages. Alternatively, the transaction routing controller 260 may generate allocation sets for one or more forecast periods and cause future call distribution to be balanced among the transaction processing systems 320 by uploading the allocation sets to an inter-exchange carrier interface or directly to the carrier routing process.

The transaction routing controller 260 may implement various agent availability routing algorithms, such as longest available agent, next available agent, and maximum available agents, and various load balancing algorithms, such as minimum expected delay, minimum queue length, and advance percent allocation.

Allocation Calculation Process

The allocation calculation process 490 may determine how the transactions are to be allocated to each of the transaction processing systems.

A business allocation agreement between a client (local) and a vendor (external) may determine fixed amount allocations and percentage allocations that may be used in an allocation set. When both types of values are used for the same time period, the following general priorities apply:

1. Fixed numbers are given priority over percentages.
2. A group that has a fixed number specified is given at least that number unless there are not enough items to satisfy all fixed amounts for all child groups. If there are not enough items, they are distributed in proportion to the fixed amounts.
3. The specified percentages are used to distribute any items remaining after the fixed amounts have been distributed.
4. Using both fixed numbers and percentages in different combinations may have a variety of allocation results. Therefore, combinations that most closely implement the client/vendor business agreement may be found.

In an example embodiment, there are 100 items (transactions or resources) that are to be allocated to two groups, an internal group (CS_INT) and an external group (CS_EXT), in a particular period. Table 1 shows how different allocation setups may determine the number of items each group receives.

TABLE 1

| Example | CS_INT # to allocate | CS_INT % to allocate | CS_EXT # to allocate | CSV_EXT % to allocate | CS_INT # allocated | CS_EXT # allocated |
|---|---|---|---|---|---|---|
| 1 | 5 | 50% | 45 | 50% | 30 | 70 |
| 2 | 300 | 50% | 100 | 50% | 75 | 25 |
| 3 | 25 | 100% | 75 | 0% | 25 | 75 |
| 4 | 0 | 25% | 0 | 75% | 25 | 75 |
| 5 | 25 | 0% | 25 | 100% | 25 | 75 |
| 6 | 10 | 0% | 30 | 0% | 25 | 75 |

These examples are further explained below:

Example 1

Fixed allocation of 5 items to CS_INT and 45 items to CS_EXT leaves 50 items to be allocated by the specified percentages. Allocating 50% (25 items) to each group means that CS_INT receives 5+25=30, and CS_EXT receives 45+25=70.

Example 2

There are too many absolute items to be distributed. Thus, items are allocated in proportion to the fixed allocation numbers. The specified percentages may not enter into this calculation. CS_INT thus receives (300/400)*100=75, and CS_EXT receives (100/400)*100=25. In such cases, a log entry is written indicating that the available amount is less than the allocation set totals.

Example 3

The absolute numbers exactly cover the number to allocate. The specified percentages may not enter into the calculation. Both groups receive the absolute number specified.

Example 4

No fixed allocation numbers have been specified, but percentages have been specified. The available items are simply divided accordingly.

Example 5

One group receives a fixed number of items (no percentage) and the other group receives a fixed number plus 100% of the remaining items. Thus both CS_INT and CS_EXT receive 25 items each, and CS_EXT also receives the remaining 50 items (100% of 50).

Example 6

Fixed numbers have been specified (no percentages), but their total is less than the number of items to be allocated. After CS_NT receives 10 items and CS_EXT receives 30 items, the remaining 60 items are allocated using the ratio of the absolute numbers (10/30), resulting in totals of 25 items for CS_INT and 75 items for CS_EXT.

Flow Chart

Figure 5:
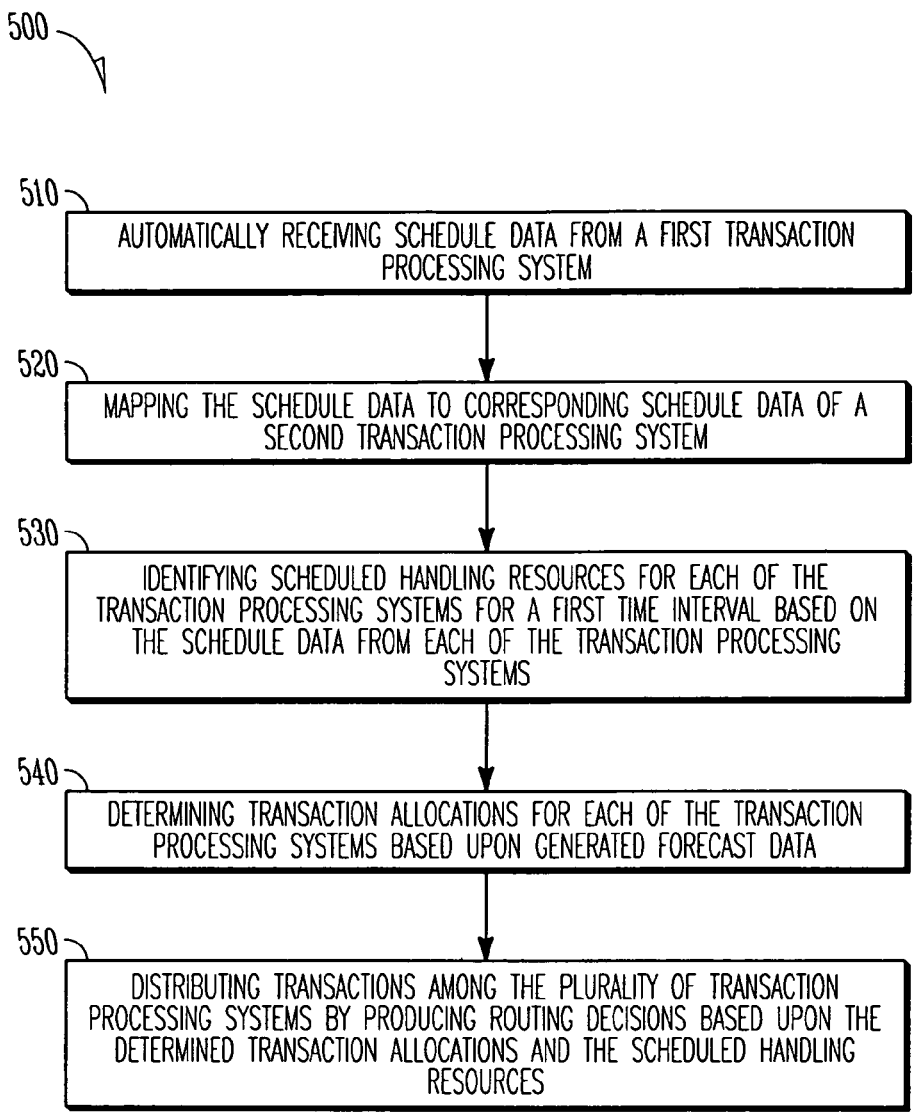
FIG. 5 illustrates a method of distributing transactions among a plurality of transaction processing systems according to one embodiment.

FIG. 5 illustrates a method 500 of distributing transactions among a plurality of transaction processing systems according to one embodiment.

The steps described below may be performed under the control of a programmed processor, such as processor 602 (shown in FIG. 6), or the logic may be implemented and distributed among hardware, firmware, software, or a combination thereof within the transaction processing systems 320 and/or the data collection controller 340, for example.

At block 510, schedule data may be automatically received from the first transaction processing system to the central call center, for example. In additional embodiments, transaction quality metrics (service level and quality goals for average handle time, and amount of calls handled, etc.) of the client may be received from the first transaction processing system.

The schedule data and/or metric data may be received from a plurality of transaction processing systems corresponding to a plurality of vendors. Each of the transaction processing systems may send scheduling and/or other information at a periodic interval, e.g. every 15 minutes. The transmittance of information may occur regardless of updated information, and may only occur in the instance of updated information, depending upon the implementation.

The transaction processing system of the remote sites may not send schedule data, but may just send actually tally values for the mapped groups. Similarly, the local sites may have tally values, rather than schedule data. The tally server 475 may include these remote tally values with the local tally values for a total tally.

At block 520, the schedule data of the first transaction processing system may be mapped to corresponding schedule data of a second transaction processing system using the mapping module 460 associated with the data collection controller 340. Again, the mapping module 460 may include mapping the resource group associated with the first transaction processing system to a corresponding resource group of the second transaction processing system. During block 520, the data collection controller 340 may processes the schedule and/or other information received from the transaction processing systems 320 according to the methods described above.

At block 530, scheduled handling resources may be identified for each of the transaction processing systems for a first time interval based on the schedule data from each of the transaction processing systems using the tally server 475.

At block 540, transaction allocations may be determined for each of the transaction processing systems based upon generated forecast data using the transaction routing controller 260 and/or the allocation calculation process 490 described herein. The forecast data may be generated in a variety of ways depending upon the implementation, using any methods that may be employed and/or known to those of skill in the art.

Transaction and/or call rate capacities may be determined based upon the generated forecast data and at least one selected from a group including desired service level, cost constraints, and historical data. Transaction allocations may be determined for each of the transaction processing systems based upon the call rate capacities. The call rate capacities may be adjusted for direct traffic to each of the transaction processing systems.

The transaction allocations may be adjusted based upon at least one selected from a group including the transaction quality metrics, updated forecast data, the determined transaction allocations, the allocation agreement, and the scheduled handling resources. In this instance, the contact center managers (e.g., the local client) may make rapid schedule and staffing adjustments, every 15 minutes, for example. Also, the contact center managers may thereby minimize outsourced resources to external transaction processing systems, and thus realize savings. The adjustments or updates of transaction allocations may also be sent on a regular basis, e.g., every 15 minutes, and may be regularly scheduled.

In an example, for the last 15 minutes the first transaction processing system has a drop in resources and a drop in quality levels. Further, the second transaction processing system has additional resources available that are not being used and the second transaction processing system has sustained quality levels. The Workforce Manager may adjust the transaction allocations accordingly until the first transaction processing system communicates that there are current additional resources available.

At block 550, transactions may be distributed among the plurality of transaction processing systems by producing routing decisions based upon the determined transaction allocations and the scheduled handling resources using the transaction routing controller 260. Distributing transactions may additionally include applying the transaction and/or call rate capacities.

Computer Architecture

Figure 6:
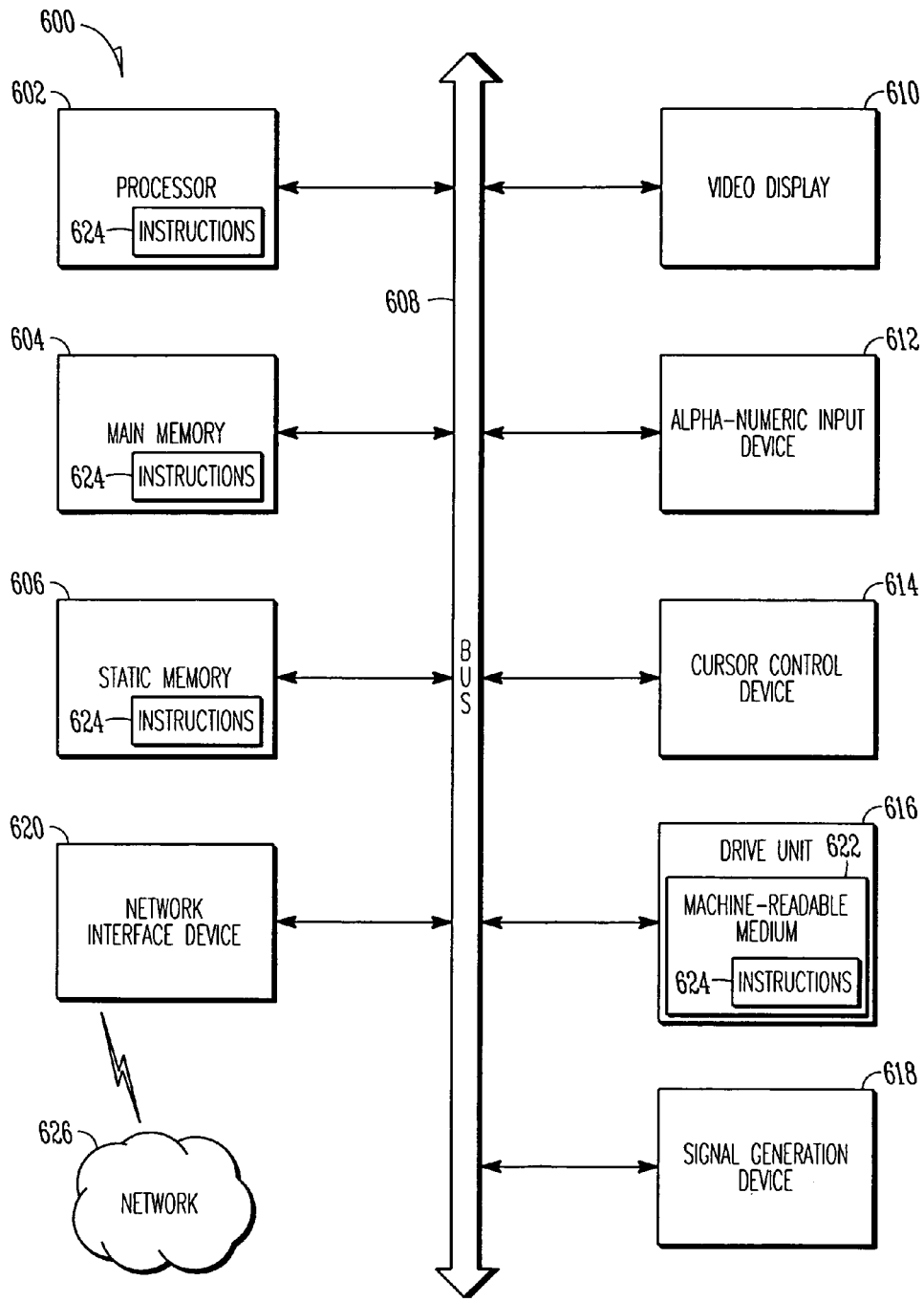
FIG. 6 shows a diagrammatic representation of a machine in the example form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of distributing transactions among a plurality of transaction processing systems, the method comprising:
   automatically receiving schedule data from a first transaction processing system;
   mapping the schedule data to corresponding schedule data of a second transaction processing system and mapping a resource group associated with the first transaction processing system to a corresponding resource group of the second transaction processing system to match up corresponding data of the resource groups;
   identifying scheduled handling resources for each of the transaction processing systems for a first time interval based on the schedule data from each of the transaction processing systems;
   determining transaction allocations for the first time interval for each of the transaction processing systems based upon generated forecast data; and
   distributing transactions among the plurality of transaction processing systems for the first time interval by producing routing decisions based upon the determined transaction allocations and the scheduled handling resources such that both fixed amount allocations and percentage allocations for the first time interval are specified for the determined transaction allocations, and the fixed amount allocations are given priority and the percentage allocations are used to distribute any transactions remaining after the fixed amount allocations have been distributed.

2. The method of claim 1, wherein determining transaction allocations comprises determining a percent of transactions to be allocated to each of the transaction processing systems.

3. The method of claim 1, further comprising:
   receiving from the first transaction processing system mapping information including a first key, a first transaction processing system site ID, and a resource group associated with the first key; and
   storing the mapping information, including the first key.

4. The method of claim 3, further comprising:
   upon receipt of the schedule data from the first transaction processing system, validating the schedule data including:
   receiving a second key along with the schedule data of the first transaction processing system; and
   comparing the first key with the second key and validating the schedule data if the keys match and discarding the data if the keys do not match.

5. The method of claim 1, further comprising: receiving schedule data from a plurality of transaction processing systems and wherein any resource group that has a fixed number of transaction specified is assigned at least the fixed number of transaction unless there are not enough transactions to distribute all the fixed amount allocations, and if there is not enough transactions to distribute then the transactions are distributed in proportion to the fixed number.

6. The method of claim 1, further comprising:
   tallying the schedule data from each of the transaction processing systems for the first time interval.

7. The method of claim 1, further comprising:
   scheduling receipt of updated schedule data from each of the transaction processing systems at a periodic time interval.

8. The method claim 4, further comprising:
   at least one of converting the received schedule data of the first transaction processing system to a same time zone of the second transaction processing system and converting the received schedule data of the first transaction processing system to the same time interval as the second transaction processing system.

9. The method claim 4, further comprising:
   transforming schedule data from an output data format to an input data format.

10. The method of claim 1, further comprising:
    determining call rate capacities based upon the generated forecast data and at least one selected from a group including desired service level, cost constraints, and historical data wherein determining transaction allocations includes determining transaction allocations for each of the transaction processing systems based upon the call rate capacities.

11. The method of claim 10, further comprising adjusting the call rate capacities for direct traffic to each of the transaction processing systems, and distributing transactions comprises applying the call rate capacities.

12. The method of claim 1, wherein the transactions comprise telephone calls and wherein each of the transaction processing systems comprise automatic call distributors.

13. The method of claim 1, wherein the transactions are received over the Internet and wherein each of the transaction processing systems comprises a web server.

14. The method of claim 13, wherein distributing transactions comprises taking into account user-defined, fixed allocation percentages associated with one or more of the transaction processing systems.

15. The method of claim 1, wherein determining transaction allocations for the first time interval for each of the transaction processing systems if further based upon an allocation agreement between a vendor and a client associated with the first transaction processing system.

16. The method of claim 15, further comprising automatically receiving transaction quality metrics of the client from the first transaction processing system.

17. The method of claim 16, further comprising distributing transactions among the plurality of transaction processing systems for the first time interval further based upon the transaction quality metrics.

18. The method of claim 15, further comprising adjusting the transaction allocations based upon at least one selected from a group including the transaction quality metrics, updated forecast data, the determined transaction allocations, the allocation agreement, and the scheduled handling resources.

19. A virtual transaction processing center comprising: an interface to automatically receive schedule data from a first transaction processing system;
  a mapping server to map the schedule data of the first transaction processing system to schedule data of a second transaction processing system; and a transaction routing controller:
  to identify scheduled handling resources for each of the transaction processing systems for a first time interval based on the schedule data from each of the transaction processing systems;
  to determine transaction allocations for the first time interval for each of the transaction processing systems based upon generated forecast data; and
  to distribute transactions among the plurality of transaction processing systems for the first time interval by producing routing decisions based upon the determined transaction allocations and the scheduled handling resources such that both fixed amount allocations and percentage allocations for the first time interval are specified for the determined transaction allocations, and the fixed amount allocations are given priority and the percentage allocations are used to distribute any transactions remaining after the fixed amount allocations have been distributed.

20. The virtual transaction processing center of claim 19, wherein a percent of transactions to be allocated to each of the transaction processing systems is determined to determine transaction allocations.

21. The virtual transaction processing center of claim 20, wherein the transaction routing controller is configured to load balance incoming transactions by generating routing decisions according to the allocation percentages.

22. The virtual transaction processing center of claim 20, wherein the transaction routing controller is configured to load balance incoming transactions by uploading the allocation percentages to an inter-exchange carrier interface.

23. A non-transitory machine-readable medium having stored thereon data representing sequences of instructions, the sequences of instructions, when executed by a machine cause the machine to:
  automatically receive schedule data from a first transaction processing system;
  map the schedule data to corresponding schedule data of a second transaction processing system;
  identify scheduled handling resources for each of the transaction processing systems for a first time interval based on the schedule data from each transaction processing system;
  determine transaction allocations for each of the transaction processing systems for the first time interval based upon generated forecast data; and
  distribute transactions among the plurality of transaction processing systems by producing routing decisions based upon the determined transaction allocations and the scheduled handling resources such that both fixed amount allocations and percentage allocations for the first time interval are specified for the determined transaction allocations, and the fixed amount allocations are given priority and the percentage allocations are used to distribute any transactions remaining after the fixed amount allocations have been distributed.

24. A virtual transaction processing center to distribute transactions among a plurality of transaction processing systems, the center comprising:
  means for automatically receiving schedule data from a first transaction processing system;
  means for mapping the schedule data to corresponding schedule data of a second transaction processing system;
  means for identifying scheduled handling resources for each of the transaction processing systems for a first time interval based on the schedule data from each of the transaction processing systems;
  means for determining transaction allocations for each of the transaction processing systems based upon generated forecast data; and
  means for distributing transactions among the plurality of transaction processing systems by producing routing decisions based upon the determined transaction allocations and the scheduled handling resources such that both fixed amount allocations and percentage allocations for the first time interval are specified for the determined transaction allocations, and the fixed amount allocations are given priority and the percentage allocations are used to distribute any transactions remaining after the fixed amount allocations have been distributed.

25. A method of distributing transactions among a plurality of transaction processing systems, the method comprising:
  automatically receiving data from a plurality of transaction processing systems;
  identifying scheduled handling resources for each of the transaction processing systems for a first time interval based on the data from each of the transaction processing systems; determining transaction allocations for the first time interval for each of the transaction processing systems based upon generated forecast data; and
  distributing transactions among the plurality of transaction processing systems for the first time interval by producing routing decisions based upon the determined transaction allocations and the scheduled handling resources such that both fixed amount allocations and percentage allocations for the first time interval are specified for the determined transaction allocations, and the fixed amount allocations are given priority and the percentage allocations are used to distribute any transactions remaining after the fixed amount allocations have been distributed.

26. The method of claim 25, wherein determining transaction allocations comprises determining a percent of transactions to be allocated to each of the transaction processing systems.

27. The method of claim 25, further comprising mapping the data of a first transaction processing system of the plurality of transaction processing systems to corresponding data of a second transaction processing system of the plurality of transaction processing systems.

28. The method of claim 27, further comprising:
receiving from the first transaction processing system mapping information including a first key, a first transaction processing system site ID, and a resource group associated with the first key; and
storing the mapping information, including the first key.

* * * * *